455-411 4J 263 5X
10/13/87 XR RE 32,521

United States Patent [19]
Fergason

[11] E Patent Number: Re. 32,521
[45] Reissued Date of Patent: Oct. 13, 1987

[54] LIGHT MODULATOR DEMODULATOR AND METHOD OF COMMUNICATION EMPLOYING THE SAME

[76] Inventor: James L. Fergason, 90 Adam Way, Atherton, Calif. 94025

[21] Appl. No.: 710,846

[22] Filed: Mar. 12, 1985

Related U.S. Patent Documents

Reissue of:
[64] Patent No.: 4,436,376
Issued: Mar. 13, 1984
Appl. No.: 235,006
Filed: Feb. 17, 1981

U.S. Applications:
[63] Continuation-in-part of Ser. No. 121,071, Feb. 13, 1980, Pat. No. 4,385,806, which is a continuation-in-part of Ser. No. 913,618, Jun. 8, 1978, abandoned.

[51] Int. Cl.[4] ..... G02F 1/13; G02F 1/00; G02F 2/00; H01S 3/00

[52] U.S. Cl. ..... 350/334; 350/332; 350/346; 350/347 E; 455/605; 455/611; 455/616; 455/617

[58] Field of Search ..... 350/332, 334, 346, 347 E; 455/605, 611, 616, 617

[56] References Cited

U.S. PATENT DOCUMENTS

| | | | |
|---|---|---|---|
| 2,039,812 | 5/1936 | Leib et al. | 343/107 |
| 3,214,590 | 10/1965 | Schactman | 455/611 X |
| 3,584,220 | 6/1971 | Nomura et al. | 455/605 |
| 3,654,473 | 4/1972 | Nussmeier | 455/611 |
| 3,694,053 | 9/1972 | Kahn | 350/347 E |
| 3,790,251 | 2/1974 | Wysocki et al. | 350/346 |
| 4,131,791 | 12/1978 | Lego, Jr. | 350/332 X |

FOREIGN PATENT DOCUMENTS 2626306 12/1977 Fed. Rep. of Germany ..... 455/605

OTHER PUBLICATIONS

Niblack, W. & Wolf, E. "Polarization Modulation and Demodulation of Light," *Applied Optics*, vol. 3, No. 2 (Feb. 1964) pp. 277–279.

*Primary Examiner*—John K. Corbin
*Assistant Examiner*—Richard F. Gallivan
*Attorney, Agent, or Firm*—Thomas H. Murray

[57] ABSTRACT

A light modulator for generating a beam of phase modulated light including a source of polarized light, at least one and preferably two liquid crystal cells having a thin layer of nematic liquid crystals of positive dielectric anistropy through which the polarized light is directed to produce a beam of light having a phase shift corresponding to a modulating electrical signal which is applied to each of the liquid crystal cells. The liquid crystal cells in addition have a continuing electrical bias applied across the layers in order to achieve the rapid response times necessary to achieve modulation of the polarized light. Demodulation of the polarized light occurs by splitting the modulated light beam into its quadrature components and developing an electrical signal corresponding to the phase difference between the two quadrature components. A communication system involving its modulators and demodulators delivers communication through light as a transmission medium.

59 Claims, 14 Drawing Figures

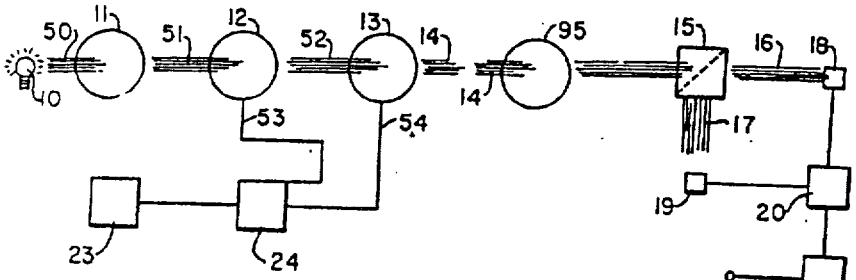
FIG. 1
FIG. 2
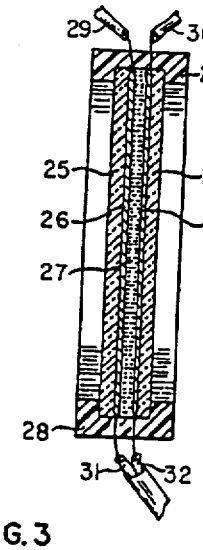
FIG. 3
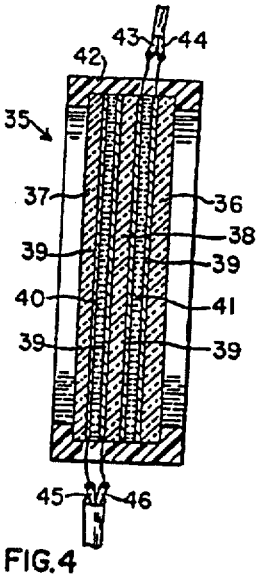
FIG. 4
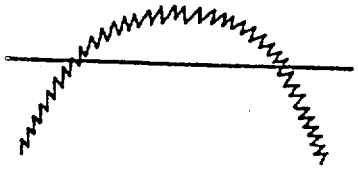
FIG. 5
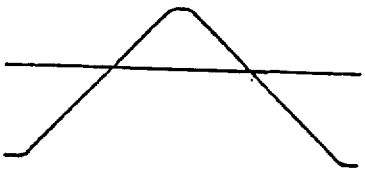
FIG. 6

LIGHT DEMODULATOR AND METHOD OF COMMUNICATION EMPLOYING THE SAME

Matter enclosed in heavy brackets [ ] appears in the original patent but forms no part of this reissue specification; matter printed in italics indicates the additions made by reissue.

CROSS-REFERENCES TO RELATED APPLICATIONS

This application is a continuation-in-part of my co-pending U.S. patent application Ser. No. 121,071 filed Feb. 13, 1980, U.S. Pat. No. 4,385,806 which is a continuation-in-part of an earlier application Ser. No. 913,618 filed June 8, 1978, now abandoned.

TERMINAL DISCLAIMER

The term of any patent issuing on this patent application shall still expire with the expiration of applicant's co-pending patent application Ser. No. 121,071, filed Feb. 13, 1980, U.S. Pat. No. 4,385,806.

BACKGROUND OF THE INVENTION

1. Field of the Invention

This invention relates to modulating polarized light by transmitting the polarized light through at least one liquid crystal cell containing a thin layer of nematic liquid crystal composition having positive dielectric anisotropy.

2. Description of the Prior Art

Liquid crystal cells containing a layer of nematic liquid crystal composition between a pair of parallel transparent plates are employed in a variety of optical installations. Such devices are used principally in digital display devices.

In my copending application Ser. No. 121,071 aforesaid, an improved liquid crystal cell is described wherein a conductive transparent film is provided on each side of the transparent flat plates which confine the liquid crystal composition and an electrical bias voltage, AC or DC, is applied to the two thin films to permit the liquid crystal composition to respond rapidly to additional electrical voltages applied across the two conductive coatings.

It is also known that thin layers of liquid crystal composition will bring about a phase shift in a beam of polarized light which is transmitted through the liquid crystal composition. Heretofore, the devices have been employed as light shutters which block the polarized light in the regions where an electrical field is established across the liquid crystal composition. Typical turn-off times of 250–300 milliseconds are common with existing liquid crystal light shutters which employ nematic liquid crystals. Such response time is much too large to permit the use of such devices in high speed communication.

SUMMARY OF THE INVENTION

According to the present invention, liquid crystal cells as described in the aforesaid U.S. patent application Ser. No. 121,071 can achieve remarkably rapid response times. Switching speeds of 10 microseconds have been achieved. Such high speed switching permits the application of oscillatory electrical signals of the order of 10 hertz to 500 kilohertz to be applied effectively to such liquid crystal cells. In accordance with this invention, an oscillatory carrier wave signal, for example, a 30 kilocycle signal, is modulated with a lower frequency communication signal, for example, an audio frequency signal or a series of signal pulses. The resulting modulated carrier wave is applied across the conductive surfaces of the electrically biased liquid crystal cell. A beam of polarized light, transmitted through such liquid crystal cell, will experience a phase shift in accordance with the applied modulated carrier wave. The resulting transmitted light beam has an identifiable phase shift which can be detected at a detection location which is remote from the light source. The detection station has facilities for separating the transmitted light beam into its quadrature components. Each of the quadrature components activates an appropriate photo responsive transducer to generate an electrical analog signal corresponding to the observed phase of each quadrature component of the light beam. The analog electrical signals are compared and a differential signal is demodulated to reproduce at the receiving location an electrical signal corresponding to the original input audio signal or chain of pulse chains introduced at the transmitting location.

The liquid crystal cell in this invention consists of a pair of transparent flat plates which are coated with an electrically conductive transparent coating and some parallel surface alignment treatment such as a polyvinyl alcohol coating which has been rubbed uniaxially. The parallel alignment of both transparent plates is parallel in this surface mode modulation invention.

A preferred embodiment of the present invention employs two such liquid crystal cells in series whereby the polarized light beam is transmitted through each of the two liquid crystal cells, each of which introduces its own independent phase shift into the light beam. The phase shifts are vectorially added whereby the two liquid crystal cells function with respect to the light beam in a manner which is analogous to the functioning of a push-pull amplifier acting upon an oscillatory electrical signal. As a consequence, the linearity of response of the resulting phase shifted light beam is remarkably increased.

It is a particular feature of the present invention that the phase shifted light beam can be delivered along with other light from the same source or from other sources to a remote detector. The phase shifted light beam can be successfully demodulated by a detector where the phase shifted light beam energy comprises a nearly insignificant portion of the total light including background light energy at the detector location, e.g., less than two percent of the incident light energy can be effective.

Accordingly, it is a principal object of this invention to provide method and apparatus for generating a phase modulated beam of polarized light.

A further object of this invention is to employ two liquid crystal cells in series to achieve remarkable linearity of response in a phase modulated polarized light beam.

It is a further object of this invention to provide a method and apparatus for phase modulation of separate components of a light source, such as red light energy, green light energy, yellow light energy, and the like.

It is a still further object of this invention to provide the phase modulating apparatus and method for any light source including by way of example natural light, fluorescent lamps, battery operated flashlights, ultraviolet light sources, infra-red light sources, laser light sources, monochromatic light sources, and the like.

A further object of the invention is to provide a method and apparatus for demodulating a phase modulated polarized light beam to reproduce a communication delivered by the phase modulated polarized light beam.

Another object of this invention is to provide a method of apparatus for remote communication systems involving transmission of light energy from a receiving location to a transmitting location and reflection communications using the same light energy back from the transmitting installation to the receiving installation.

It is a further object of the invention to provide a method and apparatus for communicating between a source and a receiver by means of a light beam.

BRIEF DESCRIPTION OF THE DRAWINGS

FIG. 1 is schematic illustration of the light modulator of this invention.

FIG. 2 is a schematic illustration of a demodulator for the modulated light beam of this invention.

FIG. 3 is a cross-section illustration taken through a light modulation liquid crystal cell unit according to one embodiment of this invention.

FIG. 4 is a cross-section illustration, similar to FIG. 3, taken through a light modulating liquid crystal cell unit according to an alternative embodiment of the present invention.

FIG. 5 is a graphical illustration of a modulated electrical signal resulting from a single liquid crystal cell according to this invention.

FIG. 6 is a graphical illustration of the modulated electrical signal resulting from two sequential liquid crystal cells according to a preferred embodiment of this invention.

DESCRIPTION OF THE PREFERRED EMBODIMENTS

Figure 7:
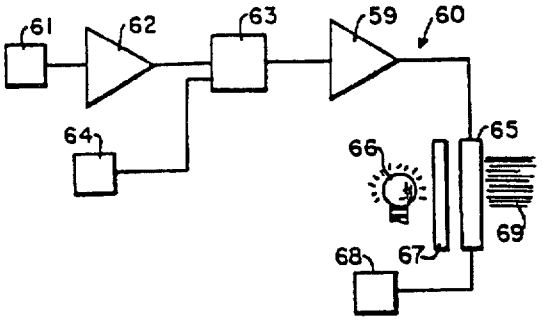
FIG. 7 is a schematic illustration of a light modulating installation according to this invention.

In accordance with the present invention, a beam of polarized light can be phase modulated in a predictable and reproduceable fashion. It is essential that the source of light be polarized initially and that the polarized light be transmitted through at least one liquid crystal cell having a thin layer of a nematic crystal composition having positive dielectric anisotropy. The liquid crystal layer is confined between parallel transparent plates, such as glass plates, which are coated with a transparent electrically conductive coating such as tin oxide or indium oxide and which are aligned by any appropriate alignment techniques such as uniaxial rubbing of a polyvinyl alcohol coating or by means of uniaxial drying techniques for other coatings. In accordance with the teachings of the aforesaid copending U.S. patent application Ser. No. 121,071, an electrical signal is applied as a bias to the two transparent electrically conductive coatings in order to align the preponderance of the liquid crystal layer except for the liquid crystal molecules immediately adjacent to the electrical conductive coatings. Thereafter the magnitude of an applied electrical signal across the two electrical conductive coatings will determine the amount by which a polarized light beam will have its phase shifted in traversing the liquid crystal cell.

Referring to the drawings, FIG. 1 shows a light source 10 and a polarizer 11 in line with two liquid crystal cells 12, 13. A light beam 50 from source 10 is delivered from polarizer 11 as a polarized beam 51 to the cells 12, 13. The liquid crystal cells 12, 13, develop a phase shift in the polarized light beam 51 which is transmitted as indicated at 14. The light beam 14 is delivered, as shown in FIG. 2, preferably through a quarter wave plate 95 (hereinafter more fully described) and thence to a polarizing cube 15 which delivers separate light beams 16, 17 related to each of the quadrature components of the incident light beam 14. The separate light beams 16, 17 are delivered to photosensitive transducers 18, 19 which develop an electrical signal related to the light beam 16, 17, respectively. The electrical signals from the transducers 18, 19 are delivered to a comparator 20 which develops an output electrical signal related to the phase difference between the two light beams 16, 17. The output signal from the comparator 20 is demodulated in a demodulator 21. An output signal is delivered at a terminal 22 corresponding to the phase shift appearing in the incident light beam 14.

The amount of modulation of phase shift introduced into the light beam by the liquid crystal cells 12, 13 may be related to an input signal from a source 23 which is modulated in a modulator 24 to produce a modulated signal which is applied through conductors 53, 54 as a bias to the liquid crystal cells 12, 13.

A typical liquid crystal cell for the present purposes is illustrated in FIG. 3 wherein a pair of transparent plates 25 is spaced apart. Each of the transparent plates 25 has a transparent electrically conductive coating 26 such as tin oxide or indium oxide. A thin layer 27 of nematic liquid crystal composition having positive dielectric anisotropy is provided between the two layers 26. The nematic liquid crystal 27 is preferably from about 6 to 60 microns in thickness. An appropriate perimeter seal such as a collar 28 is provided to confine the liquid crystal layer 27 and to retain the plates 25 in fixed relationship. Two electrical conductors 29, 30 are connected, one to each of the electrically conductive coatings 26 for applying electrical signals across the nematic liquid crystal layer 27.

In the assembly shown in FIG. 1, two individual crystal cells of the type shown in FIG. 3 may be employed. The transparent plates 25 preferably are optically clear glass although other glass may be employed as well as appropriate transparent plastic substances.

Liquid crystal compositions in general are well known. The liquid crystal cell should not have excessive absorption for the light which is being transmitted. For example, where infrared light is employed as a light source 10, the selection of the liquid crystal composition should take this factor into consideration and avoid compositions which have an absorption spectrum which includes infrared wave lengths.

By way of example, the nematic liquid crystals may include phenyl-cyclohexanes, cyano-phenyl-alkyl-benzoates and dialkyl benzoates. No problems have been encountered with the use of Shiff bases as an ingredient of the liquid crystal composition. The liquid crystal composition may be a pure single liquid crystal or may be mixtures of different liquid crystal compositions.

What is important in the present invention is the application of an electrical bias between the conductors 29, 30 which will have the effect of biasing the preponderance of the liquid crystal ingredients in the layer 27 so that the application of incremental electrical signals across the conducting layers 26 will achieve a rapid on-off cycle for the cell. The principle of applying an electrical bias is fully disclosed in copending U.S. patent application Ser. No. 121,071 aforesaid. The electrical bias which is applied to the conductors 29, 30 may be a DC bias or an AC bias. If an AC signal is applied as the bias for the liquid crystal cell, its frequency should be dissimilar to the frequency of any carrier signals which are employed as a modulating signal. By providing an electrical bias, the liquid crystal cell may be rapidly and reliably regulated whereby the phase shift experienced by a polarized light beam traversing through the liquid crystal cell will be dependent upon the instantaneous amplitude of the applied modulating signal.

An appropriate modulating signal may be applied to the electrically conductive layers 26 through electrical conductors 31, 32 (FIG. 3) or maybe added to the bias conductors 29, 30. By providing a liquid crystal cell having a response cycle time less than 30 milliseconds, the liquid crystal cell can react to oscillatory electrical impulses having frequencies of 300 kilohertz.

In the installation illustrated in FIG. 1, there are two liquid crystal cells, 12, 13 each of which is constructed similarly to that shown in FIG. 3. It is feasible to combine two or more liquid crystal cells for the purposes of the present invention into a single unit as shown in FIG. 4 wherein the liquid crystal cell unit 35 includes three spaced-apart transparent plates 36, 37, 38. The central plate 38 has a transparent electrical conducting coating 39 on both surfaces. The outer transparent plates 36, 37 have an electrical conducting 39 on their inner surface. Two layers 40, 41 of liquid crystal composition are provided between the plates 36, 38 and 37, 38. An appropriate collar 42 functions as a perimeter seal and support for the liquid crystal cell unit 35. A pair of conductors 43, 44 provides an electrical bias across the liquid crystal layer 41. A pair of electrical conductors 45, 46 provides an electrical bias across the liquid crystal layer 40. A modulating electrical signal may also be applied across the conductors 43, 44 and across the conductors 45, 46, superimposed upon the electrical bias.

The dual liquid crystal cell unit 35 provides a compact unit which will carry out the present invention in a preferred embodiment, i.e., an embodiment which employs two liquid crystal cells 12, 13.

Operation of the Device

Referring to FIG. 1, a light source 10 having a wave length from about 4 microns to about 240 millimicrons delivers a beam of light 50 through a polarizer 11 in FIG. 1 to develop a polarized light beam 51. The polarized light beam 51 is delivered through the transparent liquid crystal cell 12 to generate a first phase shifted light beam 52 which is in turn delivered through a second liquid crystal cell 13 to produce the phase shifted modulated light beam 14. The polarized light beam 51 is a light beam having waves which vibrate primarily in parallel planes. As is well known, the light waves which appear to be in the polarization planes are resultant waves which can be considered to have a fast axis component and a slow axis component at right angles to each other, also known as quadrature components. The polarized light beam 51, when passing through the liquid crystal cell 12, will experience a retardation of the slow axis component by an amount which is dependent upon the intensity of the electrical charge on the liquid crystal cell 12. Thus the light beam appearing at 52 can be distinguished from the polarized light beam at 51 in that the slow axis components of the beam have been retarded by a measurable amount which is less than a quarter wave length of the light in the beam 50. The beam 52 may be employed as a modulated light beam for delivering communications if desired. However, it is preferred to deliver the phase modulated light beam 52 through a second liquid crystal cell 13 to increase the linearity of the phase modulated beam at 14. Two such sequential liquid crystal cells function in a manner analogous to that of a push-pull amplifier.

The linearity benefits can be illustrated by referring to FIGS. 5 and 6. In a test installation, a sawtooth input signal having a frequency of 100 Hertz was modulated with a carrier signal having a frequency of 20 Kilohertz. The modulated electric signal was applied to a single liquid crystal cell containing a layer of nematic liquid crystal mixture as follows:

43.2% by weight of the reaction product of 4-heptyl benzoylchloride and a mixture of 2-methyl-1, 4-benzene diol and 4-pentyl benzoyl chloride;

22.2% by weight p-cyanophenyl-p-n-pentyl benzoate; and 34.1% by weight p-cyanophenyl-p-n-heptyl benzoate.

The resulting light beam at 51 was demodulated in apparatus of the type shown in FIG. 2 and produced an output signal as shown in FIG. 5 which is similar to a sine wave signal.

The signal of FIG. 5 has the same frequency as the input sawtooth wave, but exhibits many sub-harmonic components of the input sawtooth wave.

By employing two identical liquid crystal cells 12, 13 as shown in FIG. 1, the light wave 52 was further modulated to produce the light wave 14 which was modulated in the same apparatus to produce a signal of the type shown in FIG. 6 wherein the sawtooth linearity of the output signal is apparent. This significant improvement in linearity of output results from the use of two liquid crystal cells in series, which is analogous to a push-pull amplifier. Push-pull amplifiers achieve a higher distortion free output power than a single ended amplifier. Push-pull amplifiers employ two input signals which are equal in ampplitude and 180 degrees out of phase. Accordingly the signals applied to the liquid crystal cells 12, 13 for push-pull operation through the conductors 53, 54 respective are equal but 180 degrees out of phase.

A Particular Example

Figure 8:
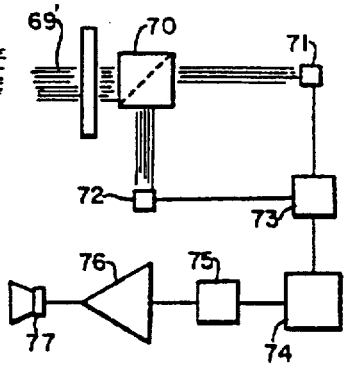
FIG. 8 is a schematic illustration of a demodulating installation for the modulated light beam of this invention.

As shown in FIGS. 7 and 8 an operating example at the present communication system is described. A transmitter station 60 of FIG. 7 includes an input signal source 61 which was the audio signal received from a public radio broadcasting station. The audio signal is delivered through an amplifier 62 to an amplitude modulator 63. A carrier wave oscillator 64 generates a 300 khz carrier wave signal delivered to the amplitude modulator 63. The resulting amplitude modulated signal is delivered from the modulator 63 through an amplifier 59 to a liquid crystal cell unit 65 including two cells of the type described in FIG. 3. A light source 66 was a sealed beam headlight obtained from an automobile parts store operating at 12 volts DC.

The liquid crystal cell unit 65 had a diameter of 4 inches. The laminates had a total thickness of about one quarter-inch. A polarizer 67 was positioned between the light source 66 and the liquid crystal cell unit 65. A bias voltage from a source 68 was also applied to the liquid crystal cell 65 in accordance with the principles set forth in the aforesaid U.S. patent application Ser. No. 121,071. The amplitude modulated carrier wave causes the light from the source 66 to experience a phase shift as it traverses the liquid crystal cell unit 65 so that the light wave 69 resulting from the phase shift is a phase modulated light wave wherein the components of the light wave in the slow axis are retarded by a reproduceable amount from the corresponoding components in the fast axis. The light wave 69 in one test was directed against a painted concrete block wall 75 feet away. The reflected light from the concrete block wall was received in a receiving station shown in FIG. 8.

The reflected light wave 69' was received in an appropriate polarized light splitter 70 which was a Brewster's-angle beam splitter. Any optical prism device might be employed which will separate the two quadrature components of the light beam 69' and deliver them separately to photodetector 71, 72 which can generate an analogous electrical signal for comparison in a comparator 73. The differential between the two quadrature electrical signals varies in accordance with the phase relation of those two signals. Hence the output signal from the comparator 73 corresponds to the modulated input signal which was applied from the amplifier 59 to the liquid crystal cell unit 65 in the transmitter station 60.

The differential signal from the comparator 73 is delivered through a demodulator 74 and the resulting audio frequency signal is filtered in a high pass, low pass filter 75 to re-establish the original input signal analogous to the signal from the source 61. The output of filter 75 is amplified in an amplifier 76 and the amplified signal is delivered to an output device 77 which was a radio speaker.

So long as the light beam 68' was directed into the splitter 70, it was possible to hear the radio broadcast at the loudspeaker 77. When the light beam 69' was interrupted, the loudspeaker 77 output was reduced or eliminated.

Alternative Modifications

Figure 9:
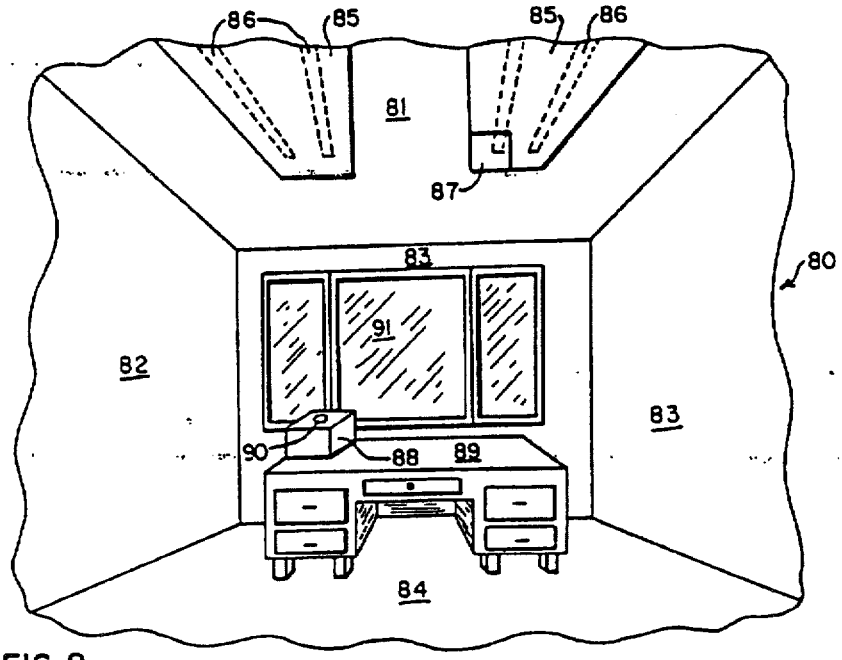
FIG. 9 is a perspective illustration of a building room sharing one embodiment of the communication system of this invention.

By employing the described system illustrated in FIGS. 7 and 8, a number of different communication systems can be achieved. For example, the light source 66 may be a fluorescent light source in a room ceiling as illustrated in FIG. 9 wherein a room 80 has a ceiling 81, sidewalls 82 and outside wall 83 and a floor 84. The ceiling 81 is equipped with familiar fluorescent fixtures 85 which contain fluorescent lamps 86 behind appropriate light diffusers. In this installation, a light modulator 87 may be applied to a small portion of the area of one or more of the ceiling fixtures 85. Electrical conductors (not shown) are connected to the light modulator 87. A portion of the light from the ceiling fixtures thus is delivered through the light modulator 87 which includes a polarizer and one or preferably two liquid crystal cells in accordance with this invention. The light within the room 80 thus includes a small percentage of light which has a phase shift resulting from the controlled modulation achieved within the modulator 87.

An appropriate communication receiving station 88 is provided somewhere within the room 80, for example, on the top of a desk 89. The receiving station 88 has a light receiving opening 90 which receives light from the room 80. The light received by the light opening 90 is in part natural outdoor light from a window 91, in part fluorescent light from the ceiling fixtures 85, and in part additional light from any other light sources which may be within the room 80 for example, incandescent table lamps, etc. A portion of the light received by the light-receiving opening 90 is the modulated light which is delivered into the room through the light modulator 87. The modulated light within the room 80 may comprise two percent or less of the total light. However, all of the light which is not part of the modulated signal will be cancelled in the beam splitter; the differential resulting from the modulated light can be readily detected within the receiving station 88. Thus, as shown in FIG. 9, it is possible to deliver communications within a room 80 from a transmitter 87 to a receiver 88. The performance of the system is certainly enhanced if the modulated light from the transmitter 87 is concentrated as a beam against the light receiving opening 90. However, it has been found to be sufficient that the modulated light constitutes as little as two percent or less of the light which is observed by the light receiving opening 90.

In a particularlly preferred embodiment of the present invention, the light received at a receiving station, for example, FIG. 2, is initially delivered through a quarter wave length retardation plate 95 which functions to optimize the intensity of the two quadrature components of the modulated light wave 14. The retardation plate 95 is not essential, but the use of the retardation plate assures that the two quadrature components of the modulated wave will have the same intensity. While a quarter wave length retardation plate is optimum, the system will also benefit from any retardation plate approximating a quarter wave length.

In this regard, it should be noted that each of the individual color components of a light wave has its own independent wave length. This a 140 nanometer retardation plate corresponds to a quarter wave length retardation for green light but is not a precisely quarter wave length retardation for red light. However, a 140 nanometer retardation plate has been found to be a useful device when employing white light as the communications medium.

Further Embodiments of the Invention

Figure 10:
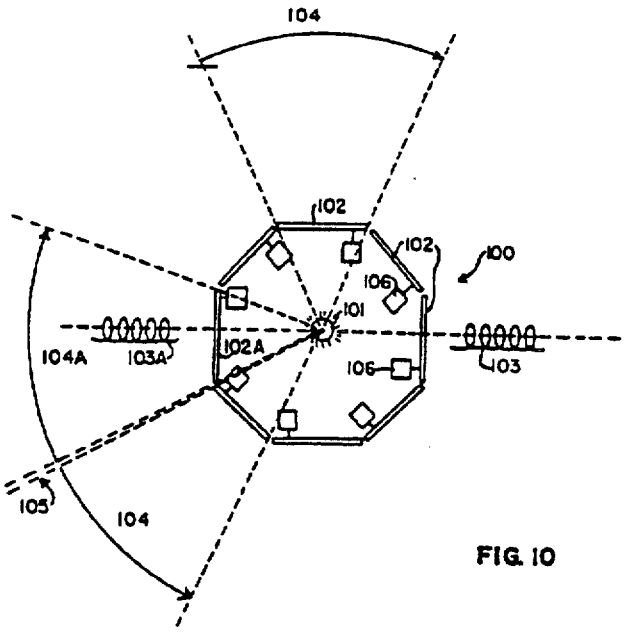
FIG. 10 is a plan view of a multidirectional light communication transmitting installation.

Referring to FIG. 10 there is illustrated a multidirectional communications installation employing the present communication system. As shown in FIG. 10, an omni-directional homing and communication device 100 includes a light source 101 surrounded by a plurality of light modulators 102, each of which includes a polarizer and at least one, preferably two, liquid crystal cells of the type illustrated in FIG. 3. The light from each of the light modulators 102 develops a modulated light beam which is schematically illustrated by the numeral 103 which radiates outwardly covering a sector 104 of the available 360° range. For example, the light modulator 102A generates a modulated light wave 103A over the sector identified by the numeral 104A.

Thus at any point in the 360° range outside the device 100 there is available one light modulated wave 103 generated from a corresponding light modulator 102 except for small radial sectors 105 which exist between adjacent sectors 104. Each individual light modulator 102 generates its unique light wave 103 in accordance with modulation signals derived from a corresponding modulator 106. Accordingly, a receiver positioned anywhere outside the device 100, so long as it is not immediately within one of the blank sectors 105, can immediately detect its position relative to the device 100 by the nature of the information which is received from the light wave 103 which is directed to the related sector 104.

The device 100 can be employed to deliver unique communications to receivers within each of the selected sectors 104.

Figure 11:
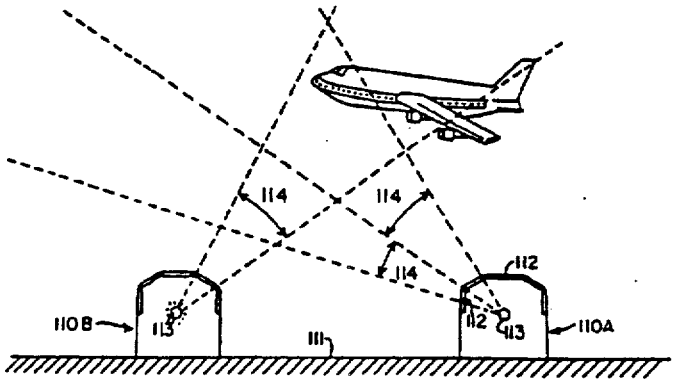
FIG. 11 is a schematic illustration of two multi-directional light communication transmitting installations and an airborne light communication receiver.

In a further embodiment as shown in FIG. 11, similar devices 110A, 100B can be mounted on the ground 111 with multiple light modulators 112 each of which receives light from a source 113. Each of the light modulators 112 includes a polarizer and at least one, preferably two, liquid crystal cells of the type shown in FIG. 3. Each of the modulators 112 generates a light wave which radiates outwardly over a sector 114. Thus sets of the devices 110 may be employed to deliver intersecting light beams which can be received by a remote airborne receiver, for example, in an airplane 115. The receiver can determine its location with respct to the two devices 110A and 110B.

Other Embodiments

Heretofore the present invention has been described in terms of a single liquid crystal cell or a single pair of cooperative liquid cells for establishing a phase shift in a beam of polarized light. It is possible that multiple phase shifts can be introduced into a single beam of polarized light and that each of the multiple phase shifts can be employed to carry distinct communication. All that is required is additional independently modulated liquid crystal cells or pairs of liquid crystal cells in series at the transmitter station and corresponding additional liquid crystal cells or pairs of liquid crystal cells at the receiving station for restoring the light wave to zero.

A further means for delivering multiple communications in a beam of light is the use of separate modulators for different color components of the light beam. The color components may be separated, modulated and recombined at the transmitter station. Thereafter at the receiving station, the combined modulated light beam may be separated into the same color constituents, each of which can be demodulated.

Figure 12:
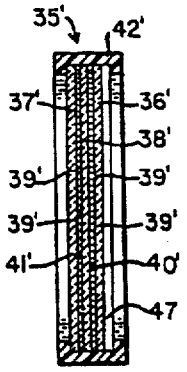
FIG. 12 is a cross-section illustration similar to FIG. 3 taken through a light modulating liquid crystal cell unit according to a further embodiment of the present invention.

A particularly useful version of the present transmitter is illustrated in FIG. 12 which is similar to the cell of FIG. 4. The unit 35' has three spaced-apart juxtaposed transparent plates 36', 37', 38'. The central plate 38' has a transparent electrical conducting coating 39' on both surfaces. The outer transparent plates 36', 37' have an electrical conducting coating 39' on their inner surface. Two layers 40', 41' of liquid crystal composition are provided between the plates 36', 38' and 37', 38' respectively. Electrical conductors (not shown) provide electrical bias across the liquid crystal layer 40' and across the liquid crystal layer 41'.

The liquid crystal cell unit 35' of FIG. 12 also includes within the collar 42' a polarizing plate 47.

In a practical construction embodying a liquid crystal cell of the type shown in FIG. 12, the thickness of the laminate including polarizing plate 47, the glass plates 36', 37', 38' and the two liquid crystal films 40', 41' has been about one quarter inch. The laminate was tested in the form of a circular disc having a diameter of about four inches.

The principle advantage of the structure illustrated in FIG. 12 is that the unit contains a complete modulating device with a polarizing plate and two liquid crystal cells in a common housing, namely a collar 42'. The device shown in FIG. 12 will function as a communications transmitter by transmitting light through the laminate from the right to the left as shown in FIG. 12, that is, through the polarizing plate 47 and thence through the two liquid crystal films 40', 41' in series. An appropriate modulated electrical signal is applied to each of the liquid crystal films 40', 41' as already described in the discussion of FIG. 4.

Figure 13:
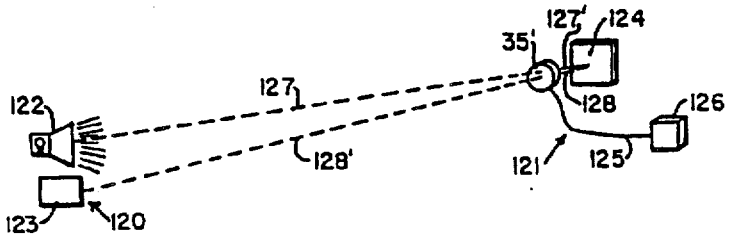
FIG. 13 is a schematic illustration of a communications transmitting and receiving installation according to a further embodiment of this invention.
Figure 14:
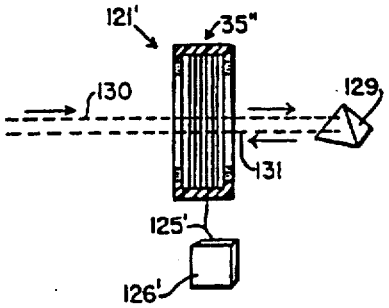
FIG. 14 is a schematic illustration of a communication transmitting installation according to a still further embodiment of this invention.

The device of FIG. 12 has a further interesting application in communications as shown in FIGS. 13, 14. Referring to FIG. 13, there is illustrated a communications including a receiving location 120 and a transmitting location 121. The receiving location includes a light source 122 and a light demodulator 123 similar to that shown in FIG. 8. The transmitting location 121 includes a reflective surface 124 such as a mirror, a shiny metal surface, a bright surface, or an appropriate reflecting prism. An electrical cable 125 delivers a modulated electrical signal from a modulator 126 to the unit 35' as shown in FIG. 7.

In the operation of the communications system of FIG. 13, light energy is delivered from the light source 122 to the unit 35' as indicated schematically by the broken line 127. The light passes through the unit 35' in the direction from left to right as shown in FIG. 12. The light thus passes sequentially through the liquid crystal film 41', liquid crystal film 40', and thereafter through the polarizing plate 47. The polarizing plate 47 transmits only polarized light. Thus the incident light at 127' on the reflective surface 124 is polarized light. Reflected light 128 passes through the liquid crystal cell unit 35' in the direction from right to left as seen in FIG. 12 and experiences the phase shifts which are introduced into the beam by the liquid crystal films 40', 41. The transmitted light beam 128' thus is modulated in accordance with the signals applied to the liquid crystal cell 35' from the modulator 126 and conductors 125. The phase modulated light beam 128' impinges on a demodulator 123 which develops a signal at the receiving location 120 corresponding to the signal introduced by the modulator 126 of the transmitting location.

A principal advantage of the communication system of FIG. 13 is that the transmitting location does not require significant power consumption, i.e., no light source is required at the transmitting location. The system further has excellent security features for restricting the information from the transmitting location 121 to the receiving station 120. The security of the transmitting location also is improved as a result of the absence of any light source.

A further refinement of the communication system of FIG. 13 is illustrated in FIG. 14 wherein the transmitting location 121' includes a liquid crystal cell unit 35" and a modulator 126' connected by a cable 125' to the liquid crystal cell unit 35". The incident light traverses the cell unit 35' from left to right in FIG. 14 and impinges upon corner reflector 129, for example, a tetrahedron prism which has the property of reflecting an incident beam in a parallel direction. The incident beam 130 is reflected from the corner reflector as a reflected beam 131 which is parallel to the incident beam 130. This system, employing a corner reflector, provides further security for the communications system.

I claim:

1. A light modulator comprising at least one liquid crystal cell comprising two parallel transparent plates; a transparent electrical conductive layer applied to the confronting surfaces of the said two plates; each said conductive layer having parallel surface alignment, the said alignment of the two adjoining surfaces being parallel; a continuous layer of nematic liquid crystal having positive dielectric anisotropy between the two electrical conducting coatings;

means for applying a fixed electrical bias to the two said electrical conducting coatings;

means for applying an amplitude modulated oscillatory electrical signal having a frequency greater than 10 hertz across the said continuous layer;

a source of polarized light directed through the said two transparent plates;

whereby the light which passes through the said two transparent plates is a phase-shifted beam which is distinguishable from the light from the said source in a manner which corresponds to the said oscillatory electrical signal.

2. A light modulator of claim 1 wherein the said continuous layer of nematic crystal has a thickness of 6 to 60 microns.

3. The light modulator of claim 1 wherein the said source of polarized light is a source of unpolarized light having a wave length from 4 microns to 240 millimicrons and a light polarizer is interposed between the said light source and the said liquid crystal cell.

4. The light modulator of claim 1 including two said liquid crystal cells in series.

5. The light modulator of claim 4 wherein the said means for applying an amplitude-modulated oscillatory electrical signal across the continuous layer of nematic liquid crystal provides a first signal to the first of said two said liquid crystal cells and applies the same inverted electrical signal to the second of said two said liquid crystal cells.

6. The light modulator of claim 1 wherein the said oscillatory electrical signal has a frequency of 10 hertz to 500 kilohertz.

7. A communications system including a light modulator in accordance with claim 1 and a light demodulator comprising:

a beam splitter which divides incident light into two separate 90 degree quadrature component beams;

a photosensitive transducer generating an oscillatory electric signal corresponding to each of said separate component beams;

means for directing each of said separate component beams to a said photosensitive transducer;

comparator means for generating an oscillatory electrical signal in accordance with the phases difference of the electrical signals from said transducers;

means for demodulating the said oscillatory electrical signal;

high pass filter means and low pass filter means;

means for delivering the demodulated signal through said filter means;

transducer means responsive to the resulting filtered demodulated signal;

and means for delivering the said phase-shifted beam from said light modulator as the said incident light for said demodulator.

8. The communications system of claim 7 wherein a quarter-wave retardation plate is interposed between said light modulator and said light demodulator.

9. A communications system including a light modulator in accordance with claim 1 which delivers a said phase-shifted beam to a receiver unit, said receiver unit including a polarized light splitter, a photosensitive transducer for generating separate electrical signals corresponding to the quadrature light beams obtained from said splitter, comparator means for generating an oscillatory electrical signal related to the phase difference between the two said quadrature signals;

demodulator means and filter means for reproducing an electrical signal which corresponds to the phase shift of said phase-shifted light beam.

10. The communications system of claim 9 wherein the said phase-shifted beam traverses a gas to the said receiver unit.

11. The communications system of claim 10 wherein the said gas is the atmosphere.

12. The commmunications system of claim 9 wherein the said phase-shifted beam traverses a transparent solid to the said receiver unit.

13. The communications system of claim 12 wherein the said transparent solid is an optical glass fiber.

14. A multi-directional communicating device comprising multiple light modulators as defined in claim 1, each being parallel to a plane which is normal to a radial from a common, fixed focus; a light source for directing polarized light through each of said multiple light modulators; means for providing a distinct phase modulation to the light beam transmitted through each of the said light modulators.

15. The directional communications system of claim 14 wherein the said light modulators are arrayed about a common light source located at the said focus.

16. A locating system including at least two communication devices as described in claim 14, said devices being arranged so that multiple phase-shifted light beams from one source intersect at least one phase-shifted light beam from the other source, and the regions of intersection identify preestablished locations with respect to the said two communication devices;

receiving means in any location being responsive to the single light beam received from each source at the said location.

17. A communications system including a receiving location having a light source and a light demodulator adapted to convert a phase modulated light beam into a corresponding electrical signal;

a transmitting location including a light modulator as described in claim 1, a reflective surface, a source of a modulated electrical signal, means for applying the said modulated electrical signal to the said light modulator and a polarizing plate disposed between said modulator and said reflected surface;

said receiving location and said transmitting location being arranged so that light from said light source can be directed through said modulator and said polarizing plate to said reflective surface; and a reflected light beam from said reflected surface is directed through said polarizing plate and through the said modulator to develop a phase modulated light beam which is directed to said demodulator at the said receiving location.

18. The communications system of claim 17 wherein the said reflective surface is a corner reflector.

19. The communication system of claim 17 wherein the said reflector surface is a reflecting prism.

20. The communications system of claim 19 wherein the said reflecting prism is a tetrahedron.

21. The communications system of claim 17 wherein the said phase-shifted beam traverses a gas to the said receiver unit.

22. The communications system of claim 21 wherein the said gas is the atmosphere.

23. The communications system of claim 17 wherein a quarter-wave retardation plate is interposed between said receiving location and the said transmitting location.

24. A communicating system including a receiving location having a light source and a light demodulator adapted to convert a phase modulated light beam into a corresponding electrical signal;

a transmitting location including a light modulator according to claim 1, a reflective surface, a source of a modulated electrical signal, means for applying the said modulated electrical signal to the said light modulator and a polarizing plate disposed between said modulator and said reflected surface;

said receiving location and said transmitting location being arranged so that light from said light source can be directed through said modulator and said polarizing plate to said reflective surface; and a reflected light beam from said reflected surface is directed through said polarizing plate and through the said modulator to develop a phase modulated light beam which is directed to said demodulator at the said receiving location.

25. A communications system including a light modulator in accordance with claim 1, means for transmitting the said phase shifted beam to a demodulator;

responsive means within said modulator which are responsive to an electrical oscillating signal; and light responsive means within said demodulator for converting said phase shifted beam to an electrical oscillating signal.

26. A light modulator comprising three juxtaposed parallel spaced-apart transparent plates having a transparent electrically conductive coating over all confronting surfaces;

a layer of nematic liquid crystal composition having positive dielectric anisotropy in the space between confronting surfaces of said plates; parallel a polarizing plate juxtaposed and parallel to said plates;

said three plates and said polarizing plate being secured in fixed relation; means for applying a fixed electrical bias to the confronting coatings;

means for applying an amplitude modulated oscillatory electrical signal across each said layer of the nematic liquid crystal composition;

said modulator being adapted to develop a phase shift in a beam of light passing through the said modulator from the said polarizing plate and thence through the said layer of nematic liquid crystal composition.

27. The light modulator of claim 26 wherein the said three plates and the said polarizing plate are secured in a common housing.

*28. A light modulator according to claim 1 wherein the said amplitude-modulated oscillatory electrical signal corresponds to separate color components of a light source.*

*29. The light modulator of claim 1 including means for converting the said phase-shifted light to a corresponding amplitude-modulated signal.*

*30. The light modulator of claim 29 wherein the said amplitude-modulated signal is fully-modulated.*

*31. The light modulator of claim 4 wherein the oscillatory electrical signal applied to a first of said liquid crystal cells is opposite in phase to the electrical signal applied to the second of said liquid crystal cells.*

*32. A method for controlling polarized light comprising:*

*(a) establishing a film of nematic liquid crystal having positive dielectric anisotropy between two parallel surfaces and imparting a first generally parallel surface orientation to the said liquid crystal film at the said surfaces;*

*(b) establishing a second bulk orientation of the bulk of the liquid crystal in a direction which is different from the said first generally parallel orientation of the liquid crystal at the said surfaces;*

*(c) applying a varying electrical signal to said surfaces to alter the relative direction of the alignment of the liquid crystal between the said surface orientation and the said bulk orientation;*

*(d) passing polarized light through said film to generate light which is phase shifted in a manner corresponding to the said varying electrical signal.*

*33. The method of claim 32 wherein the phase-shifted light corresponds to a separation of separate color components of a light source.*

*34. The method of claim 33 wherein the said phase-shifted light corresponds to green light components from a light source.*

*35. The method of claim 33 wherein the said phase-shifted light corresponds to red light components from a light source.*

*36. The method of claim 33 wherein the said phase-shifted light corresponds to yellow light components from a light source.*

*37. The method of claim 32 wherein the said film is established between transparent conducting electrodes.*

*38. The method of claim 37 wherein the said transparent conducting electrodes are formed predominantly from oxides of metals selected from the class consisting of tin and indium.*

*39. The method of claim 32 including the step of converting the phase-shifted light to a corresponding amplitude-modulated signal.*

*40. The method of claim 39 wherein the said phase-shifted light is converted in a polarizing filter.*

*41. The method of claim 39 wherein the said step of converting the phase shifted light develops a fully amplitude-modulated signal.*

*42. The method of claim 32 wherein the said amplitude-modulated light corresponds to a separation of separate color components of a light source.*

43. The method of claim 32 including the step of separately modulating the red components and the green components of the said light source.

44. A method for controlling polarized light comprising:

(a) establishing a film of nematic liquid crystal having positive dielectric anisotropy between two parallel surfaces and imparting a first generally parallel surface orientation to the said liquid crystal film at the said surfaces;

(b) establishing a second generally parallel bulk orientation of the bulk of the liquid crystal in a direction which is different from the said first generally parallel surface orientation of the liquid crystal at the said surfaces;

(c) applying a varying electrical signal to said surfaces to change the alignment of the liquid crystal between the said surface orientation and the said bulk orientation;

(d) passing polarized light through said film to generate light which is phase shifted in a manner corresponding to the said varying electrical signal.

45. In the method for controlling polarized light according to claim 44, maintaining the direction of orientation of the bulk of the liquid crystal generally perpendicular to the said surfaces of the film.

46. The method of claim 44 wherein the phase-shifted light corresponds to a separation of separate color components of a light source.

47. The method of claim 46 wherein the said phase-shifted light corresponds to green light components from a light source.

48. The method of claim 46 wherein the said phase-shifted light corresponds to red light components from a light source.

49. The method of claim 46 wherein the said phase-shifted light corresponds to yellow light components from a light source.

50. The method of claim 44 wherein each of the said spaced-apart films is established between transparent conducting electrodes.

51. The method of claim 50 wherein the said transparent conducting electrodes are formed predominantly from oxides of metals selected from the class consisting of tin and indium.

52. A method for controlling polarized light comprising:

(a) establishing two spaced apart films of nematic liquid crystal having positive dielectric anisotropy, each said film contained between two parallel surfaces; imparting a generally parallel alignment of each liquid crystal film at its surfaces;

(b) applying a varying electrical signal to the said surface of each said film to align the direction of each liquid crystal film at its surfaces in directions which are different from the orientation of the bulk of each liquid crystal film;

(c) passing polarized light through each said film in sequence to generate light which is phase shifted in a manner corresponding to the said varying electrical signals, wherein the resultant phase shift of the two said films corresponds to the vector summation of the phase shift resulting from each of the said two spaced apart film.

53. In the method of claim 52 applying a said electrical signal applied to one of said films which is opposite in phase to the electrical signal applied to the other of said films.

54. In the method of claim 52 including the step of converting the phase-shifted light to a corresponding amplitude-modulated signal.

55. The method of claim 54 wherein the said phase-shifted light is converted in a polarizing filter.

56. The method of claim 54 wherein the said step of converting the phase shifted light develops a fully amplitude-modulated signal.

57. The method of claim 52 wherein the said amplitude-modulated light corresponds to a separation of separate color components of a light source.

58. The method of claim 52 including the step of separately modulating the red components and the green components of the said light source.

59. A method for controlling polarized light comprising:

(a) establishing a film of nematic liquid crystal having positve dielectric anisotropy between two parallel surfaces and imparting a first generally parallel surface orientation to the said liquid crystal film at the said surfaces;

(b) establishing a second bulk orientation of the bulk of the liquid crystal in a direction which is different from the said first generally parallel orientation of the liquid crystal at the said surfaces;

(c) altering the relative direction of the alignment of the liquid crystal between the said surface orientation and the said bulk orientation;

(d) whereby the phase shifting property of the film corresponds to the said relative direction.

* * * * *

UNITED STATES PATENT AND TRADEMARK OFFICE
CERTIFICATE OF CORRECTION

PATENT NO. : B1 Re. 32,521

DATED : September 18, 1990

INVENTOR(S) : James L. Fergason

It is certified that error appears in the above-identified patent and that said Letters Patent is hereby corrected as shown below:

The title page should be deleted to appear as per attached title page. Col. 1 and 2 should be deleted to be replace with col. 1 thur 12 as per attached sheets.

Signed and Sealed this

Eighteenth Day of June, 1991

*Attest:*

HARRY F. MANBECK, JR.

*Attesting Officer*

*Commissioner of Patents and Trademarks*

REEXAMINATION CERTIFICATE (1353rd)

United States Patent [19] [11] B1 Re. 32,521

Fergason [45] Certificate Issued Sep. 18, 1990

[54] LIGHT MODULATOR DEMODULATOR AND METHOD OF COMMUNICATION EMPLOYING THE SAME

[76] Inventor: James L. Fergason, 90 Adam Way, Atherton, Calif. 94025

Reexamination Request:
No. 90/001,777, Jun. 2, 1989

Reexamination Certificate for:

| | |
|---|---|
| Patent No.: | **Re. 32,521** |
| Issued: | **Oct. 13, 1987** |
| Appl. No.: | **710,846** |
| Filed: | **Mar. 12, 1985** |

Related U.S. Patent Documents

Reissue of:

| | | |
|---|---|---|
| [64] | Patent No.: | **4,436,376** |
| | Issued: | **Mar. 13, 1984** |
| | Appl. No.: | **235,006** |
| | Filed: | **Feb. 17, 1981** |

U.S. Applications:

[63] Continuation-in-part of Ser. No. 121,071, Feb. 13, 1980, Pat. No. 4,385,806, which is a continuation-in-part of Ser. No. 913,618, Jun. 8, 1978, abandoned.

[51] Int. Cl.[5] ..... G02F 1/13; G02F 1/00; G02F 2/00; H01S 3/00

[52] U.S. Cl. ..... 350/334; 350/332; 350/346; 350/347 E; 350/337; 455/605; 455/611; 455/616; 455/617

[58] Field of Search ..... 350/332, 334, 347 E, 350/337; 455/605, 611, 616, 617

[56] References Cited

U.S. PATENT DOCUMENTS

| | | | |
|---|---|---|---|
| 3,214,590 | 10/1965 | Schactman | 250/199 |
| 3,588,324 | 6/1971 | Marie | 178/5.4 |
| 3,654,473 | 4/1972 | Nussmeier | 250/199 |
| 3,694,053 | 9/1972 | Kahn | 350/150 |
| 3,785,721 | 1/1974 | Harsch | 350/150 |
| 4,232,948 | 11/1980 | Shanks | 350/347 |
| 4,411,496 | 10/1983 | Nonomura et al. | 350/347 E |

OTHER PUBLICATIONS

K. Uehara, H. Mada, and S. Kobayashi, "Reduction of Electrooptical Response Times of a Field-Effect Liquid-Crystal Device: Application to Dynamic-Driven Real-Time Matrix Display," published in *IEEE Transactions on Electron Devices* ED-22, No. 9, Sep. 1975, pp. 804-805.

James L. Fergason, "Performance of a Matrix Display Using Surface Mode," *Proceedings of the 1980 Biennial Display Research Conference*, p. 177.

S. Sato and M. Wada, "Reduction of Response and Recovery Times of Nematic Cells with Electrically Controlled Birefringence," *Electronics and Communications in Japan*, vol. 60-C, No. 11, 1977, p. 129.

T. Shimomura, H. Mada, and S. Kobayashi, "Angular Dependence of Voltage Controlled Color Formation With a Twisted Nematic Liquid Crystal Cell," *Japan. J. Appl. Phys.* vol. 15, No. 9, 1977, pp. 1815-1816.

Fang-Shang Chen, "Modulators for Optical Communication," *Proceedings of The IEEE*, vol. 58, No. 10, Oct. 1970, pp. 1446-1457.

E. Norman Lurch, *Fundamentals of Electronics*, (2d ed. 1971), pp. 535-537.

Terry J. Scheffer and Hans C. Grüler, "Electro-Optics of Liquid Crystals", Ch. 22 in *Molecular Electro-Optics Part 2*, pp. 790-811, (C. O'Konski ed. 1978).

*Primary Examiner*—S. D. Miller

[57] ABSTRACT

A light modulator for generating a beam of phase modulated light including a source of polarized light, at least one and preferably two liquid crystal cells having a thin layer of nematic liquid crystals of positive dielectric anistropy through which the polarized light is directed to produce a beam of light having a phase shift corresponding to a modulating electrical signal which is applied to each of the liquid crystal cells. The liquid crystal cells in addition have a continuing electrical bias applied across the layers in order to achieve the rapid response times necessary to achieve modulation of the polarized light. Demodulation of the polarized light occurs by splitting the modulated light beam into its quadrature components and developing an electrical signal corresponding to the phase difference between the two quadrature components. A communication system involving its modulators and demodulators delivers communication through light as a transmission medium.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–31, 52 and 54–56 is confirmed.

Claims 32, 42–44, 50, 53 and 57–59 are determined to be patentable as amended.

Claims 33–41, 45–49 and 51, dependent on an amended claim, are determined to be patentable.

New claims 60–156 are added and determined to be patentable.

32. A method for controlling polarized *multicolor* light comprising:

(a) establishing a film of nematic liquid crystal having positive dielectric anisotropy between two parallel surfaces and imparting a first generally parallel surface orientation to the said liquid crystal film at the said surfaces;

(b) establishing a second bulk orientation of the bulk of the liquid crystal in a direction which is different from the said first generally parallel orientation of the liquid crystal at the said surfaces;

(c) applying a varying electrical signal to said surfaces to alter the relative direction of the alignment of the liquid crystal between the said surface orientation and the said bulk orientation;

(d) passing polarized light through said film to generate light which is phase shifted in a manner corresponding to the said varying electrical signal*; and wherein said step of applying a varying electrical signal comprises applying such electrical signal to effect phase shifting of such polarized light without significant color dispersion thereby to permit on-off modulation of said multicolor light.*

42. The method of claim [32] *39* wherein the said amplitude-modulated [light] *signal* corresponds to a separation of separate color components of a light source.

43. The method of claim [32] *42* including the step of separately modulating the red components and the green components of the said light source.

44. A method for controlling polarized *multicolor* light comprising:

(a) establishing a film of nematic liquid crystal having positive dielectric anisotropy between two parallel surfaces and imparting a first generally parallel surface orientation to the said liquid crystal film at the said surfaces;

(b) establishing a second generally parallel bulk orientation of the bulk of the liquid crystal in a direction which is different from the said first generally parallel surface orientation of the liquid crystal at the said surfaces;

(c) applying a varying electrical signal to said surfaces to change the alignment of the liquid crystal between the said surface orientation and the said bulk orientation;

(d) passing polarized light through said film to generate light which is phase shifted in a manner corresponding to the said varying electrical signal*; and wherein said step of applying a varying electrical signal comprises applying such electrical signal to effect phase shifting of such polarized light without significant color dispersion thereby to permit on-off modulation of light.*

50. The method of claim 44 wherein [each of the ] said [spaced-apart films] *film* is established between transparent conducting electrodes.

53. In the method of claim 52 applying a said electrical signal [applied] to one of said films which is opposite in phase to the electrical signal applied to the other of said films.

57. The method of claim [52] *54* wherein the said amplitude-modulated [light] *signal* corresponds to a separation of separate color components of a light source.

58. The method of claim [52] *57* including the step of separately modulating the red components and the green components of the said light source.

59. A method for controlling polarized *multicolor* light comprising:

(a) establishing a film of nematic liquid crystal having positive dielectric anisotropy between two parallel surfaces and imparting a first generally parallel surface orientation to the said liquid crystal film at the said surfaces;

(b) establishing a second bulk orientation of the bulk of the liquid crystal in a direction which is different from the said first generally parallel orientation of the liquid crystal at the said surfaces;

(c) altering the relative direction of the alignment of the liquid crystal between the said surface orientation and the said bulk orientation;

(d) whereby the phase shifting property of the film corresponds to the said relative direction*; and wherein said step of altering the relative direction of the alignment of the liquid crystal comprises performing such altering to effect phase shifting of light without significant color dispersion thereby to permit on-off modulation of light.*

*60. The method of claim 52 wherein each of the said spaced apart films is established between a pair of transparent conducting electrodes.*

*61. The method of claim 32 wherein said passing polarized light comprises passing multicolor polarized light.*

*62. The method of claim 61 wherein said passing multicolor polarized light comprises passing white polarized light.*

*63. The method of claim 32 wherein said step of establishing a second bulk orientation comprises applying an electrical input to the liquid crystal.*

*64. A method for controlling polarized light comprising:*

*( a) establishing a film of nematic liquid crystal having positive dielectric anisotropy between two parallel surfaces and imparting a first generally parallel surface orientation to the said liquid crystal film at the said surfaces;*

*(b) establishing a second bulk orientation of the bulk of the liquid crystal in a direction which is different from*

*the said first generally parallel orientation of the liquid crystal at the said surfaces;*

*(c)applying a varying electrical signal to said surfaces to alter the relative direction of the alignment of the liquid crystal between the said surface orientation and the said bulk orientation;*

*(d) passing polarized light through said film to generate light which is phase shifted in a manner corresponding to the said varying electrical signal; and further comprising the step of adjusting the phase shift of the quadrature components of the polarized light.*

*65. The method of claim 64 wherein said adjusting comprises placing an optical retarder in the path of such polarized light.*

*66. The method of claim 65 wherein said placing an optical retarder comprises placing a quarter wave plate in the path of such polarized light.*

*67. The method of claim 44 wherein said passing polarized light comprises passing multicolor polarized light.*

*68. The method of claim 67 wherein said passing multicolor polarized light comprises passing white polarized light.*

*69. The method of claim 44 wherein said step of establishing a second generally parallel bulk orientation comprises applying an electrical input to the liquid crystal.*

*70. A method for controlling polarized light comprising:*

*(a) establishing a film of nematic liquid crystal having positive dielectric anisotropy between two parallel surfaces and imparting a first generally parallel surface orientation to the said liquid crystal film at the said surfaces;*

*(b) establishing a second generally parallel bulk orientation of the bulk of the liquid crystal in a direction which is different from the said first generally parallel surface orientation of the liquid crystal at the said surfaces;*

*(c) applying a varying electrical signal to said surfaces to change the alignment of the liquid crystal between the said surface orientation and the said bulk orientation;*

*(d) passing polarized light through said film to generate light which is phase shifted in a manner corresponding to the said varying electrical signal; and further comprising the step of adjusting the phase shift of the quadrature components of the polarized light.*

*71. The method of claim 70 wherein said adjusting comprises placing an optical retarder in the path of such polarized light.*

*72. The method of claim 71 wherein said placing an optical retarder comprises placing a quarter wave plate in the path of such polarized light.*

*73. The method of claim 52 wherein said passing polarized light comprises passing multicolor polarized light.*

*74. The method of claim 73 wherein said passing multicolor polarized light comprises passing white polarized light.*

*75. The method of claim 52, further comprising the step of adjusting the phase shift of the quadrature components of the polarized light.*

*76. The method of claim 75 wherein said adjusting comprises placing an optical retarder in the path of such polarized light.*

*77. The method of claim 76 wherein said placing an optical retarder comprises placing a quarter wave plate in the path of such polarized light.*

*78. The method of claim 59 wherein said passing polarized light comprises passing multicolor polarized light.*

*79. The method of claim 78 wherein said passing multicolor polarized light comprises passing white polarized light.*

*80. The method of claim 59 wherein said step of establishing a second bulk orientation comprises applying an electrical input to the liquid crystal.*

*81. A method for controlling polarized light comprising:*

*(a) establishing a film of nematic liquid crystal having positive dielectric anisotropy between two parallel surfaces and imparting a first generally parallel surface orientation to the said liquid crystal film at the said surfaces;*

*(b) establishing a second bulk orientation of the bulk of the liquid crystal in a direction which is different from the said first generally parallel orientation of the liquid crystal at the said surfaces;*

*(c) altering the relative direction of the alignment of the liquid crystal between the said surface orientation and the said bulk orientation;*

*(d) whereby the phase shifting property of the film corresponds to the said relative direction; and*

*further comprising the step of adjusting the phase shift of the quadrature components of the polarized light.*

*82. The method of claim 81 wherein said adjusting comprises placing an optical retarder in the path of such polarized light.*

*83. The method of claim 82 wherein said placing an optical retarder comprises placing a quarter wave plate in the path of such polarized light.*

*84. A method for controlling polarized light comprising:*

*(a) establishing a film of nematic liquid crystal having positive dielectric anisotropy between two parallel surfaces and imparting a first generally parallel surface orientation to the said liquid crystal film at the said surfaces;*

*(b) establishing a second bulk orientation of the bulk of the liquid crystal in a direction which is different from the said first generally parallel orientation of the liquid crystal at the said surfaces;*

*(c) applying a varying electrical signal to said surfaces to alter the relative direction of the alignment of the liquid crystal between the said surface orientation and the said bulk orientation;*

*(d) passing polarized light through said film to generate light which is phase shifted in a manner corresponding to the said varying electrical signal;*

*(e) establishing a further film of nematic liquid crystal having positive dielectric anistropy between two further parallel surfaces and imparting a first generally parallel surface orientation to the said further liquid crystal film at the said further surfaces;*

*(f) establishing a second bulk orientation of the bulk of the further film of liquid crystal in a direction which is different from the said first generally parallel orientation of the liquid crystal at the said further surfaces;*

*(g) applying a varying electrical signal to said further surfaces to alter the relative direction of the alignment of the liquid crystal between the said surface orientation and the said bulk orientation;*

*(h) passing such first mentioned polarized light passed through said first mentioned film through said further film to generate light which is phase shifted in a manner corresponding to both of said varying electrical signals.*

*85. A method for controlling polarized light comprising:*

*(a) establishing a film of nematic liquid crystal having positive dielectric anisotropy between two parallel surfaces and imparting a first generally parallel sur-*

*face orientation to the said liquid crystal film at the said surfaces;*

*(b) establishing a second generally parallel bulk orientation of the bulk of the liquid crystal in a direction which is different from the said first generally parallel surface orientation of the liquid crystal at the said surfaces;*

*(c) applying a varying electrical signal to said surfaces to change the alignment of the liquid crystal between the said surface orientation and the said bulk orientation;*

*(d) passing polarized light through said film to generate light which is phase shifted in a manner corresponding to the said varying electrical signal;*

*(e) establishing a further film of nematic liquid crystal having positive dielectric anisotropy between two further parallel surfaces and imparting a first generally parallel surface orientation to the said further liquid crystal film at the said further surfaces;*

*(f) establishing a second generally parallel bulk orientation of the bulk of the further film of liquid crystal in a direction which is different from the said first generally parallel surface orientation of the liquid crystal at the said further surfaces;*

*(g) applying a varying electrical signal to said further surfaces to change the alignment of the liquid crystal between the said surface orientation and the said bulk orientation;*

*(h) passing such first mentioned polarized light received from said first mentioned film through said further film to generate light which is phase shifted in a manner corresponding to both of said varying electrical signals.*

*86. A method for controlling polarized light comprising:*

*(a) establishing a film of nematic liquid crystal having positive dielectric anisotropy between two parallel surfaces and imparting a first generally parallel surface orientation to the said liquid crystal film at the said surfaces;*

*(b) establishing a second bulk orientation of the bulk of the liquid crystal in a direction which is different from the said first generally parallel orientation of the liquid crystal at the said surfaces;*

*(c) altering the relative direction of the alignment of the liquid crystal between the said surface orientation and the said bulk orientation;*

*(d) whereby the phase shifting property of the film corresponds to the said relative direction; and*

*(e) establishing a further film of nematic liquid crystal having positive dielectric anisotropy between two further parallel surfaces and imparting a first generally parallel surface orientation to the said further liquid crystal film at the said further surfaces;*

*(f) establishing a second bulk orientation of the bulk of the further film of liquid crystal in a direction which is different from the said first generally parallel orientation of the liquid crystal at the said further surfaces;*

*(g) altering the relative direction of the alignment of the liquid crystal between the said surface orientation and the said bulk orientation;*

*(h) whereby the phase shifting property of the films corresponds to the said relative directions.*

*87. A method for controlling polarized multicolor light comprising:*

*(a) establishing a film of nematic liquid crystal having positive dielectric anisotropy between two parallel surfaces and imparting a first generally parallel surface orientation to the said liquid crystal film at the said surfaces;*

*(b) establishing and substantially maintaining a second bulk orientation of the bulk of the liquid crystal in a direction which is different from the said first generally parallel orientation of the liquid crystal at the said surfaces;*

*(c) applying a varying electrical signal to said surfaces to alter the relative direction of the alignment of the liquid crystal between the said surface orientation and the said bulk orientation;*

*(d) passing polarized light through said film to generate light which is phase shifted in a manner corresponding to the said varying electrical signal; and*

*wherein said step of applying a varying electrical signal comprises applying such electrical signal to effect phase shifting of such polarized light without significant color dispersion thereby to permit on-off modulation of light.*

*88. The method of claim 87 wherein the phase-shifted light corresponds to a separation of separate color components of a light source.*

*89. A method for controlling polarized light comprising:*

*(a) establishing a film of nematic liquid crystal having positive dielectric anisotropy between two parallel surfaces and imparting a first generally parallel surface orientation to the said liquid crystal film at the said surfaces;*

*(b) establishing and substantially maintaining a second bulk orientation of the bulk of the liquid crystal in a direction which is different from the said first generally parallel orientation of the liquid crystal at the said surfaces;*

*(c) applying a varying electrical signal to said surfaces to alter the relative direction of the alignment of the liquid crystal between the said surface orientation and the said bulk orientation;*

*(d) passing polarized light through said film to generate light which is phase shifted in a manner corresponding to the said varying electrical signal;*

*wherein the phase-shifted light corresponds to a separation of separate color components of a light source; and*

*including the step of separately modulating the red components and the green components of the said light source.*

*90. A method for controlling polarized multicolor light comprising:*

*(a) establishing a film of nematic liquid crystal having positive dielectric anisotropy between two parallel surfaces and imparting a first generally parallel surface orientation to the said liquid crystal film at the said surfaces;*

*(b) establishing and substantially maintaining a second generally parallel bulk orientation of the bulk of the liquid crystal in a direction which is different from the said first generally parallel surface orientation of the liquid crystal at the said surfaces;*

*(c) applying a varying electrical signal to said surfaces to change the alignment of the liquid crystal between the said surface orientation and the said bulk orientation;*

*(d) passing polarized light through said film to generate light which is phase shifted in a manner corresponding to the said varying electrical signal; and*

*wherein said step of applying a varying electrical signal comprises applying such electrical signal to effect phase shifting of such polarized light without significant color dispersion thereby to permit on-off modulation of light.*

*91. The method of claim 90 wherein the phase-shifted light corresponds to a separation of separate color components of a light source.*

*92. A method for controlling polarized light comprising:*

*(a) establishing a film of nematic liquid crystal having positive dielectric anisotropy between two parallel surfaces and imparting a first generally parallel surface orientation to the said liquid crystal film at the said surfaces;*

*(b) establishing and substantially maintaining a second generally parallel bulk orientation of the bulk of the liquid crystal in a direction which is different from the said first generally parallel surface orientation of the liquid crystal at the said surfaces;*

*(c) applying a varying electrical signal to said surfaces to change the alignment of the liquid crystal between the said surface orientation and the said bulk orientation;*

*(d) passing polarized light through said film to generate light which is phase shifted in a manner corresponding to the said varying electrical signal;*

*wherein the phase-shifted light corresponds to a separation of separate color components of a light source; and*

*including the step of separately modulating the red components and the green components of the said light source.*

*93. A method for controlling polarized multicolor light comprising:*

*(a) establishing a film of nematic liquid crystal having positive dielectric anisotropy between two parallel surfaces and imparting a first generally parallel surface orientation to the said liquid crystal film at the said surfaces;*

*(b) establishing and substantially maintaining a second bulk orientation of the bulk of the liquid crystal in a direction which is different from the said first generally parallel orientation of the liquid crystal at the said surfaces;*

*(c) altering the relative direction of the alignment of the liquid crystal between the said surface orientation and the said bulk orientation;*

*(d) whereby the phase shifting property of the film corresponds to the said relative direction; and*

*wherein said step of altering the relative direction of the alignment of the liquid crystal comprises performing such altering to effect phase shifting of light without significant color dispersion thereby to permit on-off modulation of light.*

*94. The method of claim 93 wherein the phase-shifted light corresponds to a separation of separate color components of a light source.*

*95. A method for controlling polarized light comprising:*

*(a) establishing a film of nematic liquid crystal having positive dielectric anisotropy between two parallel surfaces and imparting a first generally parallel surface orientation to the said liquid crystal film at the said surfaces;*

*(b) establishing and substantially maintaining a second bulk orientation of the bulk of the liquid crystal in a direction which is different from the said first generally parallel orientation of the liquid crystal at the said surfaces;*

*(c) altering the relative direction of the alignment of the liquid crystal between the said surface orientation and the said bulk orientation;*

*(d) whereby the phase shifting property of the film corresponds to the said relative direction;*

*wherein the phase-shifted light corresponds to a separation of separate color components of a light source; and*

*including the step of separately modulating the red components and the green components of the said light source.*

*96. The method of claim 52, wherein said applying comprises applying a respective modulated electrical signal to each of said films.*

*97. The method of claim 96, wherein said applying a respective modulated electrical signal comprises applying a respective signal that effects relative push-pull operation of said films.*

*98. The method of claim 52, further comprising the step of for each of such two spaced apart films of nematic liquid crystal establishing a bulk orientation of the bulk of the liquid crystal film in a direction which is different from the generally parallel alignment of the respective liquid crystal film at the surfaces thereof.*

*99. The method of claim 98, wherein said step of establishing a bulk orientation comprises establishing such bulk orientation in a direction that is generally perpendicular to the generally parallel alignment of the respective liquid crystal film at the surfaces thereof.*

*100. The method of claim 32, further comprising the step of adjusting the phase shift of the quadrature components of the polarized light.*

*101. The method of claim 100, wherein said adjusting comprises placing an optical retarder in the path of such polarized light.*

*102. The method of claim 101, wherein said placing an optical retarder comprises placing a quarter wave plate in the path of such polarized light.*

*103. A method for controlling polarized light comprising:*

*(a) establishing a film of nematic liquid crystal having positive dielectric anisotropy between two parallel surfaces and imparting a first generally parallel surface orientation to the said liquid crystal film at the said surfaces;*

*(b) establishing a second bulk orientation of the bulk of the liquid crystal in a direction which is different from the said first generally parallel orientation of the liquid crystal at the said surfaces;*

*(c) applying a varying electrical signal to said surfaces to alter the relative direction of the alignment of the liquid crystal between the said surface orientation and the said bulk orientation;*

*(d) passing polarized light through said film to generate light which is phase shifted in a manner corresponding to the said varying electrical signal; and*

*including the step of converting the phase-shifted light to a corresponding amplitude-modulated signal, wherein the said amplitude-modulated signal corresponds to a separation of separate color components of a light source, and including the step of separately modulating the red components and the green components of the said light source.*

*104. The method of claim 103 wherein the said film is established between transparent conducting electrodes.*

*105. The method of claim 104 wherein the said transparent conducting electrodes are formed predominantly from oxides of metals selected from the class consisting of tin and indium.*

*106. The method of claim 103 wherein the said phase-shifted light is converted in a polarizing filter.*

*107. The method of claim 103 wherein the said step of converting the phase-shifted light develops a fully amplitude-modulated signal.*

*108. The method of claim 103 wherein said passing polarized light comprises passing multicolor polarized light.*

*109. The method of claim 108 wherein said passing multicolor polarized light comprises passing white polarized light.*

*110. The method of claim 103 wherein said step of establishing a second bulk orientation comprises applying an electrical input to the liquid crystal.*

*111. The method of claim 103 further comprising the step of adjusting the phase shift of the quadrature components of the polarized light.*

*112. The method of claim 111 wherein said adjusting comprises placing an optical retarder in the path of such polarized light.*

*113. The method of claim 112 wherein said placing an optical retarder comprises placing a quarter wave plate in the path of such polarized light.*

*114. The method of claim 64 wherein the phase-shifted light corresponds to a separation of separate color components of a light source.*

*115. The method of claim 114 wherein the said phase-shifted light corresponds to green light components from a light source.*

*116. The method of claim 114 wherein the said phase-shifted light corresponds to red light components from a light source.*

*117. The method of claim 114 wherein the said phase-shifted light corresponds to yellow light components from a light source.*

*118. The method of claim 64 wherein the said film is established between transparent conducting electrodes.*

*119. The method of claim 118 wherein the said transparent conducting electrodes are formed predominantly from oxides of metals selected from the class consisting of tin and indium.*

*120. The method of claim 64 including the step of converting the phase-shifted light to a corresponding amplitude-modulated signal.*

*121. The method of claim 120 wherein the said phase-shifted light is converted in a polarizing filter.*

*122. The method of claim 120 wherein the said step of converting the phase shifted light develops a fully amplitude-modulated signal.*

*123. The method of claim 120 wherein the said amplitude-modulated signal corresponds to a separation of separate color components of a light source.*

*124. The method of claim 123 including the step of separately modulating the red components and the green components of the said light source.*

*125. The method of claim 64 wherein said passing polarized light comprises passing multicolor polarized light.*

*126. The method of claim 125 wherein said passing multicolor polarized light comprises passing white polarized light.*

*127. The method of claim 64 wherein said step of establishing a second bulk orientation comprises applying an electrical input to the liquid crystal.*

*128. The method of claim 84 wherein said passing polarized light comprises passing multicolor polarized light.*

*129. The method of claim 128 wherein said passing multicolor polarized light comprises passing white polarized light.*

*130. The method of claim 84 wherein said step of establishing a second bulk orientation comprises applying an electrical input to the liquid crystal.*

*131. The method of claim 32, further comprising the step of converting the phase shifted polarized light to a corresponding fully amplitude-modulated signal.*

*132. The method of claim 44, further comprising the step of adjusting the phase shift of the quadrature components of the polarized light.*

*133. The method of claim 132 wherein said adjusting comprises placing an optical retarder in the path of such polarized light.*

*134. The method of claim 133 wherein said placing an optical retarder comprises placing a quarter wave plate in the path of such polarized light.*

*135. The method of claim 44, further comprising the step of converting the phase shifted polarized light to a corresponding fully amplitude-modulated signal.*

*136. In the method for controlling polarized light according to claim 70, maintaining the direction of orientation of the bulk of the liquid crystal generally perpendicular to the said surfaces of the film.*

*137. The method of claim 70 wherein the phase-shifted light corresponds to a separation of separate color components of a light source.*

*138. The method of claim 137 wherein the said phase-shifted light corresponds to green light components from a light source.*

*139. The method of claim 137 wherein the said phase-shifted light corresponds to red light components from a light source.*

*140. The method of claim 137 wherein the said phase-shifted light corresponds to yellow light components from a light source.*

*141. The method of claim 70 wherein said film is established between transparent conducting electrodes.*

*142. The method of claim 141 wherein the said transparent conducting electrodes are formed predominantly from oxides of metals selected from the class consisting of tin and indium.*

*143. The method of claim 70 wherein said passing polarized light comprises passing multicolor polarized light.*

*144. The method of claim 143 wherein said passing multicolor polarized light comprises passing white polarized light.*

*145. The method of claim 70 wherein said step of establishing a second generally parallel bulk orientation comprises applying an electrical input to the liquid crystal.*

*146. The method of claim 70, further comprising the step of converting the phase shifted polarized light to a corresponding fully amplitude-modulated signal.*

*147. The method of claim 85 wherein said passing polarized light comprises passing multicolor polarized light.*

*148. The method of claim 147 wherein said passing multicolor polarized light comprises passing white polarized light.*

*149. The method of claim 85 wherein said step of establishing a second generally parallel bulk orientation comprises applying an electrical input to the liquid crystal.*

*150. The method of claim 52, wherein said step of applying a varying electrical signal comprises applying such electrical signal to effect phase shifting of such polarized light without significant color dispersion thereby to permit on-off modulation of light.*

*151. The method of claim 59, further comprising the step of adjusting the phase shift of the quadrature components of the polarized light.*

*152. The method of claim 151 wherein said adjusting comprises placing an optical retarder in the path of such polarized light.*

*153. The method of claim 152 wherein said placing an optical retarder comprises placing a quarter wave plate in the path of such polarized light.*

*154. The method of claim 81 wherein said passing polarized light comprises passing multicolor polarized light.*

*155. The method of claim 154 wherein said passing multicolor polarized light comprises passing white polarized light.*

*156. The method of claim 81 wherein said step of establishing a second bulk orientation comprises applying an electrical input to the liquid crystal.*

* * * * *